United States Patent Office 3,046,190
Patented July 24, 1962

3,046,190
GERMICIDES
David Alexander Lindsay Seiler, Burnham, England, and Joseph Patrick Brown, Bryn Castell, Geufron, Llangollen, Wales, assignors to Monsanto Chemicals Limited, London, England, a British company
No Drawing. Filed Aug. 30, 1957, Ser. No. 681,157
Claims priority, application Great Britain Sept. 28, 1956
4 Claims. (Cl. 167—31)

This invention relates to germicides containing chlorinated phenols as active ingredients.

Chlorinated phenols have for years formed the basis of many commercial germicidal compositions, and much work has been carried out in attempts to find formulations of chlorinated phenols having improved germicidal potency. Both variation of the substituents in the aromatic ring, leading to new compounds, and new methods of formulating known compounds, have resulted in germicides of higher activity, and examples of improvement in germicidal properties by formulation are described in British Patents 743,984 and 762,388, in the germicides of which acid conditions are employed to enhance the activity of the phenols.

The present invention is concerned with germicides based on a mixture of chlorinated phenols of two different classes which it has been found can be formulated together to give an unexpected improvement in germicidal potency. It has been discovered that when 2:4-dichloro-3:5-dimethylphenol (commonly known as DCMX) and a germicidal benzylmethylchlorophenol (that is, a germicidal phenol containing benzyl, methyl, and chlorine as substituents in the nucleus, are formulated together, the formulation can be carried out in such a way as to give a stable germicidal concentrate having an activity which is greater than the sum of the activities of the substances when they are formulated separately. The dispersing or solubilising properties of the mixture of chlorophenols appear to enable the use of less dispersing agent in the formulation, and the improved properties may partly result from the use of less dispersing agent, for dispersing agents (such as castor oil soap) used in formulating chlorophenols tend to impair their germicidal activity. Whether the effect is truly synergistic or not, a valuable and unexpected improvement in germicidal efficiency can be obtained.

The germicide of the invention is accordingly one comprising 2:4-dichloro-3:5-dimethylphenol and a germicidal benzylmethylchlorophenol.

Suitable germicidal benzylmethylchlorophenols are for instance 2-benzyl-4-chloro-5-methylphenol and 2-benzyl-4-chloro-3:5-dimethylphenol. The latter of these two particular compounds may be designated "benzyl PCMX" and is particularly suitable for use in the germicides of the present invention. The benzyl group can itself be substituted; for instance the methylene portion can be substituted by a methyl group, as in 2-(α-phenylethyl)-4-chloro-5-methylphenol.

Various methods can be used to obtain the germicidal benzylmethylchlorophenols. Useful compounds can for instance be readily prepared by the reaction of benzyl chloride with a suitable derivative of the appropriate chlorinated cresol or xylenol, for instance as described in British Patent 417,785. Other benzylmethylchlorophenols which are suitable can be obtained by chlorination of a benzylmethylphenol, that is to say of course a benzylcresol. A commercial benzylcresol usually contains a mixture of isomers, and accordingly the chlorinated material will also be a mixture. A suitable benzylcresol for chlorination is the material sold under the name "Cresantol 3" (Cresantol is a registered trademark). Materials analogous to benzylcresols can also be chlorinated, for instance benzylxylenols. Whilst products containing varying amounts of chlorine can be used those obtained by introducing approximately one atom of chlorine are particularly suitable.

In order to formulate a concentrated germicide according to the invention, a suitable amount of each of the chlorinated phenols can be dispersed in water with the assistance of a water-soluble organic solvent for chlorinated phenols (for instance methylated spirits, methanol or ethanol) and a suitable dispersing agent. The latter can be for example an anionic dispersing agent, for instance a soap (such as castor oil soap) or an alkyl arylsulphonate, or a non-ionic dispersing agent, for instance a condensation product of ethylene oxide with a phenol or a higher alcohol. A concentrated germicide suitable for dilution with water for direct use can contain from 0.5 to 5% by weight (preferably from 1 to 3%) of the mixture of chlorinated phenols, and these can be formulated with for example methylated spirits and castor oil soap, the quantity of castor oil soap used being preferably sufficient (in practice the minimum sufficient) with the methylated spirits present to ensure that the resulting germicidal concentrate has a cloud point of not more than −4° C. Such a formulation is then stable at all temperatures which are likely to be encountered in practice.

It is usually convenient to use equal quantities by weight of DCMX and the benzylmethylchlorophenol, but provided a substantial proportion of one or other of them is present, the benefit of the new effect is obtained. Thus from 10 to 90% by weight of DCMX can be used in conjunction with 90 to 10% of the benzylmethylchlorophenol; preferably from 20 to 80% of one and from 80 to 20% of the other is employed. Of course a mixture of DCMX with two or more benzylmethylchlorophenols can be used if desired.

In order to show the advantages of using the mixture of chlorinated phenols, comparative tests were carried out on formulations prepared containing them and formulations containing the individual chlorinated phenols. A standard procedure was used for formulating the chlorinated phenol (or mixture of chlorinated phenols) and in testing for germicidal potency. This procedure is now described.

The chlorinated phenol (or mixture of chlorinated phenols) (2 g.) was dissolved in a small, measured, quantity of methylated spirits, a quantity of castor oil soap to act as dispersing or solubilising agent was added, and the mixture diluted to 100 cc. with distilled water, the quantity of castor oil soap used being the minimum sufficient with the methylated spirits present to ensure that the resulting germicidal concentrate had a cloud point of not more than −4° C.

Serial dilutions with distilled water were made using this concentrate, and a 5 cc. portion of each dilution at 17° C. was inoculated with 0.2 cc. of bacterial culture. After 5 minutes, and again after 10 minutes, had elapsed since this inoculation, a sample of each portion was used for the inoculation of a tube of sterile nutrient broth (Oxoid Nutrient Broth No. 2), each dilution thus giving two inoculated tubes of nutrient broth. The tubes were allowed to incubate for 24 hours at 37° C. and then examined for the presence of bacterial growth.

From this examination was found the dilution in which the formulated chlorinated phenol failed to kill all the bacteria of the original inoculum within 5 minutes, but succeeded within 10 minutes. This dilution was designated "the minimum active concentration" of the germicidal concentrate. This concentration was next converted to a "minimum active concentration" of the unformulated chlorinated phenol by multiplying by 50, and the figure obtained was finally divided by a similarly determined "minimum active concentration" of phenol ($C_6H_5OH$). A "phenol coefficient" was thus established for the chlorinated phenol in respect of the organisms *Salmonella typhi* and *Staphylococcus aureus*, and this phenol coefficient was a measure of the germicidal potency of the chlorinated phenol under conditions in which it could be formulated.

The invention is illustrated by the following examples:

*Example 1*

In this example the results of tests on mixtures of DCMX with benzyl PCMX are compared with those using the individual chlorinated phenols; the test procedure used was that described above. The formulations tested were made by mixing together the components shown below.

| Chlorinated Phenol | Formulated with— | | | Phenol coefficient | |
|---|---|---|---|---|---|
| | Methylated spirits, cc. | 50% Aqueous castor oil soap, cc. | | *S. typhi* | *S. aureus* |
| DCMX, 2 g | 12 | 10 | Found | 285 | 100 |
| Benzyl PCMX, 2 g. | 10 | 6 | Found | 65 | 145 |
| DCMX, 1 g.<br>+<br>Benzyl PCMX, 1 g. | 10 | 6 | Found | 285 | 235 |
| | | | Expected | 175 | 120 |
| DCMX, 1.5 g.<br>+<br>Benzyl PCMX, 0.5 g. | 10 | 6 | Found | 285 | 215 |
| | | | Expected | 230 | 110 |

The above results illustrate the unexpectedly high germicidal activity of the formulations containing DCMX and benzyl PCMX. It will be noted that less castor oil soap is required to formulate the DCMX/benzyl PCMX mixture than is required to formulate DCMX alone.

*Example 2*

This example describes the results obtained when a mixture of DCMX and a benzylmethylchlorophenol obtained by chlorination of a commercial benzylcresol is compared for germicidal activity with the individual chlorinated phenols.

The benzylmethylchlorophenol was obtained by chlorinating with chlorine gas a commercial benzylcresol sold under the name "Cresantol 3" (having a boiling range of about 320°–340° C.) until approximately one atom of chlorine had been introduced into the benzene nucleus.

Formulations were then prepared by mixing together the appropriate components indicated below, and the formulations were tested using the procedure of Example 1. The terpineol was present to give each formulation a pleasant smell.

| Chlorinated Phenol | Formulated with— | | | Phenol coefficient | |
|---|---|---|---|---|---|
| | Methylated spirits, g. | 50% Aqs. castor oil soap, g. | Terpineol g. | *S. typhi* | *S. aureus* |
| DCMX, 2 g | 8 | 8 | 4 | Found 300 | 130 |
| Chlorinated benzylcresol, 2 g | 8 | 8 | 4 | Found 200 | 100 |
| DCMX, 1 g<br>+<br>chlorinated benzylcresol, 1 g | 8 | 8 | 4 | Found 350<br>Expected 250 | 200<br>115 |

The results again showed the unexpectedly high germicidal activity of the formulation containing DCMX and the chlorinated benzylcresol.

What we claim is:

1. A germicide comprising 2:4-dichloro-3:5-dimethylphenol and a germicidal benzylmethylchlorophenol.
2. A germicide according to claim 1, in which the benzylmethylchlorophenol is 2-benzyl-4-chloro-3:5-dimethylphenol.
3. A germicide comprising 10% to 90% by weight of 2:4-dichloro-3:5 dimethyl phenol and 90% to 10% of a germicidal benzyl methyl chlorophenol, the percentages being based on the total of the substituted phenols.
4. A germicide comprising 10% to 90% by weight of 2:4-dichloro-3:5 dimethyl phenol and 90% to 10% of 2-benzyl 4-chloro-3:5 dimethyl phenol, the percentages being based on the total of the substituted phenols.

References Cited in the file of this patent

UNITED STATES PATENTS

| | | |
|---|---|---|
| 1,162,152 | Flemming | Nov. 30, 1915 |
| 1,879,351 | Lehmann et al. | Sept. 27, 1932 |
| 1,880,566 | Weiler et al. | Oct. 4, 1932 |
| 1,953,413 | Klarmann | Apr. 3, 1934 |
| 1,981,123 | Roche | Nov. 20, 1934 |
| 1,984,646 | Klarmann | Dec. 18, 1934 |
| 2,085,318 | Klarmann | June 29, 1937 |
| 2,267,101 | Hueter et al. | Dec. 23, 1941 |

FOREIGN PATENTS

| | | |
|---|---|---|
| 743,984 | Great Britain | Jan. 25, 1956 |
| 762,388 | Great Britain | Nov. 28, 1956 |

OTHER REFERENCES

Lewis: Perfume and Essential Oil Review, vol. 45, pages 258–262, August 1954.